UNITED STATES PATENT OFFICE.

L. HARPER, OF NAVASINK, NEW JERSEY.

IMPROVEMENT IN FERTILIZERS.

Specification forming part of Letters Patent No. 26,184, dated November 22, 1859.

*To all whom it may concern:*

Be it known that I, LOUIS HARPER, of the Highlands of Navasink, in the county of Monmouth, in the State of New Jersey, have invented a new and Improved Fertilizer; and I do hereby declare that the following is a full and exact description thereof, reference being had to the specimen sent in with my caveat, filed under the 24th of September last, to which others shall be added if deemed necessary.

The nature of my invention consists in providing for a most effective fertilizer equal to the very best existing, in order to enrich the soil for an increased population of human beings.

For the basis of my new and improved fertilizer I have selected the peat or muck, which is found in all northern countries in great abundance, especially in the northeastern part of the United States and the British Provinces. This peat or "muck," as it is generally called, originates from the decomposition of vegetable matter in general, especially of the peat-moss (*Sphagnum palustre*) of some *Equiretaeæ*, *Irideæ*, and other marsh or other bog plants. It contains, besides the carbon of decomposed vegetable matter, crenic, apacrenic, humic, sulphuric, phosphoric and silicic acids, ulmin, humin, lime, magnesia, alumina, oxides of iron and manganese, and small quantities of alkalies, soda, potash, and even ammonia. It is therefore a valuable fertilizer by itself, and frequently used as such where it can be procured in sufficient quantity in the vicinity; but it is not concentrated enough for the application of a small quantity only and too bulky to bear the expenses of transportation to any considerable distance. It has even been used in composition with other, especially nitrogenous, matter as a compost, but never before as the basis of a compound chemically-prepared fertilizer, as herein described.

For the manufacture of my new and improved fertilizer the peat or muck must be considerably decomposed. It should be taken out of the peat-swamps in the fall of the year and left exposed during the winter to the influence of the atmosphere, especially to the frost, in layers or beds of about twelve or eighteen inches thick, sheltered from washing atmospheric preciptations. The layers may be turned once or twice during the winter, if the weather permits it.

In cases of necessity the muck may be dug in the spring or summer and left exposed for some time to the influence of the atmosphere in thin layers; but it is much preferable to dig it in the fall previous, as before stated.

Before the peat is to be used it is freed from all undecomposed vegetable matter and thoroughly pulverized, if the latter be necessary. It is less necessary if the peat has been dug in the fall previous and left exposed during the winter to the disintegrating influence of the frost. It is then carefully mixed (according to the kind of fertilizer for which it is destined, as will be found below) with from ten to twenty per cent. (or even twenty-five per cent., if destined for lime-plants) of sulphate of lime (gypsum or plaster-of-paris) ($CaSO_3 + 2HO$) and from six to ten per cent. (and even more than that, if the fertilizer shall serve for soda-plants) of sulphate of soda, ($NaOSO_3 + 10HO$.) It is best to employ for this purpose the residue from the fabrication of sulphuric acid, commonly called "niter cakes." Both of these salts are previously very finely pulverized. The mixture is then again deposited in beds or layers not more than from six to nine inches thick. From four to ten per cent. of carbonate of potash of commerce ($KOCO_2$) is then dissolved in an adequate quantity of water, and one-half of the solution is sprinkled over the above layers or beds as equally as possible. After the lapse of about twenty-four hours, or more, the layers are turned and the remainder of the potash solution sprinkled over them in such a manner that the whole mass becomes thoroughly moist. If the second half of the potash solution does not afford fluid enough for that purpose, more water is added, in order to enable the different salts to dissolve and exchange their acids according to their affinities. When this has been done the beds are thrown into a heap or heaps, and the compound is then, after the lapse of from six to eight days, ready for impregnation with ammonia. This is done in the following manner: A sufficient quantity of nitrogenous animal matter, either offal from slaughtered animals, carcasses of dead animals of any description, or fish, such as are caught in great abundance on the coasts of New England, New York, New Jersey, &c., during the largest part of the year, (*crustacea* or *mollusca*,) is ground to a pulp. If fish is taken the flesh of which contains a very large proportion of water, (from seventy to seventy-three per cent.,) not less than a quantity equal in weight to the prepared muck with which it is mixed must be employed. If other more solid or even dry animal matter be used, the quantity can be much reduced and regulated, according to the richness of it in nitrogenous matter fit for generating ammonia. This pulp of the nitrogenous matter is intimately mixed with an adevuate quantity of the prepared peat or muck, according to the quantity of ammonia desired. If the pulp be of fish, an equal quantity in weight of prepared muck is taken, more if other richer nitrogenous matter be chosen. It is then deposited in a bed or layer of about twelve inches in thickness in a shed, sheltered from washing atmospheric precipitations, and, in the hot season, also from the immediate rays of the sun, but otherwise open to the free circulation of the air.

If the fertilizer be destined for such crops as require phosphoric acid ($PO_5HO$) or phosphates for their full development for the purposes for which they are cultivated—as, for instance, for grain, cotton, &c.—from ten to twenty-five per cent. (according to the kind of fertilizer) of finely-pulverized animal-bones is dissolved in an excess of sulphuric acid ($SO_3$) or oil of vitriol diluted with three or four times its bulk of water, (according to a well-known and frequently-applied principle) and in that manner changed into biphosphate or superphosphate and sulphate of lime. The bone-dust is dissolved in an excess of sulphuric acid, not merely to facilitate solution, but especially in order to fix the nascent ammonia not uniting with other acids or salts as a sulphate ($NH_3 OSO_3HO$) and prevent its escape. The excess of acid is regulated according to the quantity of nitrogenous matter. It can amount to from ten to fifteen per cent. When the bone-dust is completely dissolved it is mixed with an appropriate quantity of prepared muck and equally spread over the bed containing the nitrogenous matter, or it may be spread over it unmixed and covered with the necessary quantity of prepared peat. The bed remains in this state quietly for several days, after the lapse of which it is moistened with water (sea-water, if possible) and kept moist until the process is completed. When it has sunk down and become too compact it must be loosened from time to time in order to admit the oxygen of the atmosphere and accelerate decomposition.

When the mass commences to emit a strong odor it must be carefully examined, whether it continues acid or not. If not, and the ammonia escapes, it is again rendered acid by sprinkling it with the necessary quantity of sulphuric acid diluted in from seven to ten times its quantity of water; but care must be taken not to render the mass too acid that it remains so after the entire decomposition of the animal matter. I employ sulphuric acid for rendering the mass again acid when it becomes too early neutral and the ammonia escapes, because it is the cheapest. Other acids—as nitric, ($NO_5$,) or, better, hydrochloric or muriatic ($HCl$)—may be taken and the escaping ammonia fixed as a chloride, muriate of ammoniacal, sal-ammoniac, or even urine of men and animals, or both together, may be employed to fix the ammonia as a urate. The ammonia is not apt to escape, as the peat has the power of absorbing the ammoniacal gas in large quantity, like all carbon. The fertilizer can therefore be prepared to react alkaline exactly like guano. When the decomposition of the animal matter is nearly completed the bed may be carefully turned, instead of loosening it, and this can be repeated once or twice in order to mix the mass intimately. After the entire decomposition of the animal matter and the completion of the generation of ammonia and its conversion according to the chemical affinities to the acids and bases employed into humates, crenates, apocrenates, sulphates, and double salts, with phosphoric acid and another base, the bed is either spread out in a thin layer or transported to a perfectly dry place, where it remains and is frequently turned until it is thoroughly dry and loses nothing more of its weight in the open air. It is then reduced to an impalpable powder in the most convenient manner and ready for use.

In such countries where no peat or muck is found the lignite or brown coal of the tertiary formations of our earth can be substituted. It contains very nearly the same ingredients as the peat, and is equally as good and a still better absorber of ammonia. For this purpose the lignite, which is free from sulphuret of iron, or contains only a small quantity of it, is dug in the fall, to be exposed to the influence of the atmosphere during the winter, and then dried in the immediate rays of the sun. By this process it crumbles into small cubical particles. When thoroughly dry it is to be ground to a fine powder, and then treated exactly in the same manner as the peat or muck.

I prepare three different kinds of fertilizer for the different crops cultivated in the United States, viz:

1. *Common fertilizer.*—For all such plants which are cultivated for their grains or seeds, or which require phosphates, as Indian corn, wheat, rye, barley, oats, buckwheat, rice, &c., and for cotton, grape-vines, fruit-trees, &c.— For this fertilizer the highest proportion of dissolved bones is taken and the lowest of sulphate of lime and alkalies. For rice, which requires very little nitrogen, the quantity of ammonia is especially diminished and the phosphates and alkalies increased.

2. *Root-fertilizer.*—For all kinds of plants cultivated for their roots, as potatoes, sweet potatoes, turnips, carrots, parsnips, &c., and, besides, for cabbages, hops, and sugar-cane.—For this fertilizer the lowest proportion of dissolved bones is used and a high proportion of sulphate of lime and the alkalies.

3. *Herb-fertilizer.*—For all kinds of plants cultivated for their herbage, as grasses, clover, esparret, lucerne, flax, tobacco, &c.—For this fertilizer no dissolved bones are added. If fish with its bones and scales has been used for impregnation with ammonia or if flesh, without bones, has been used only two or three per cent. of dissolved bone-dust is added, but the highest proportion of sulphate of lime, soda, and especially potash. For tobacco, which requires the largest quantity of nitrogen, nitrate of potash ($KONO_5$) is employed instead of carbonate. For silica-plants, and for heavy clay soils destitute of silica, I add, besides, to the peat as soon as it has been freed from undecomposed vegetable matter from ten to thirty-three per cent. of the best green sand-marl of New Jersey.

I have already stated that I am aware that peat has been used as a fertilizer in composition with other matter. I therefore do not claim its use alone or simply combined either with saline substances or nitrogenous matter; but

What I claim as my invention, and desire to secure by Letters Patent in the preparation of my fertilizer in general, as described, is—

1. The preparation of the peat or muck or lignite and their mixture with sulphate of lime, soda, potash, and magnesia where required to form the basis of the preparation intended for composition of the fertilizer.

2. The addition of phosphate and biphosphate of lime to the above basis and the impregnation of the above mixture with ammonia in the manner described, so as to be converted into simple and double salts, as above stated.

3. The combination of peat or muck or lignite, prepared as described, with green sand-marl.

LOUIS HARPER.

Witnesses:
H. POMEROY,
GEO. M. MOUNT.